May 3, 1960   P. A. CHOMBARD   2,934,960
FREE GYROSCOPES
Filed June 29, 1953   4 Sheets-Sheet 1
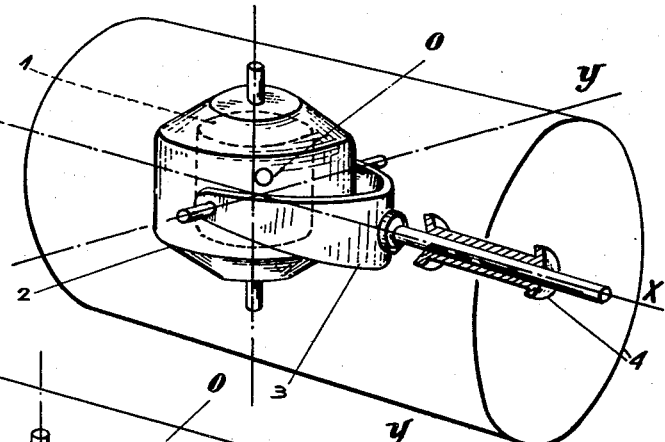
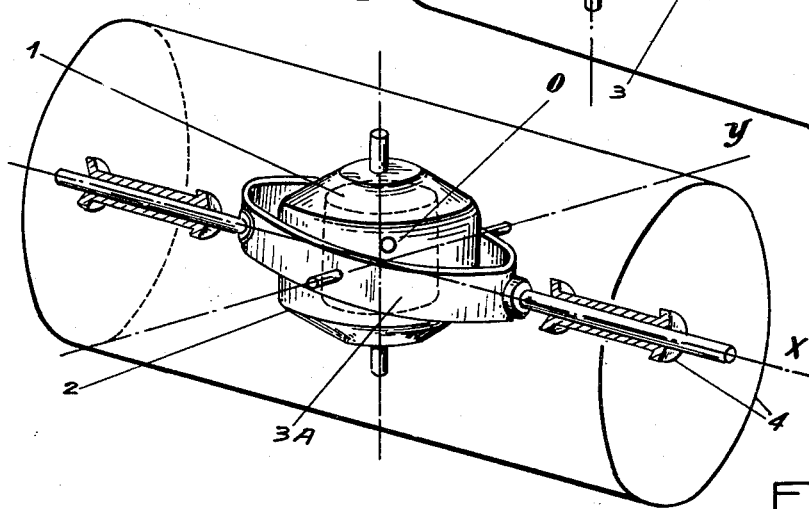
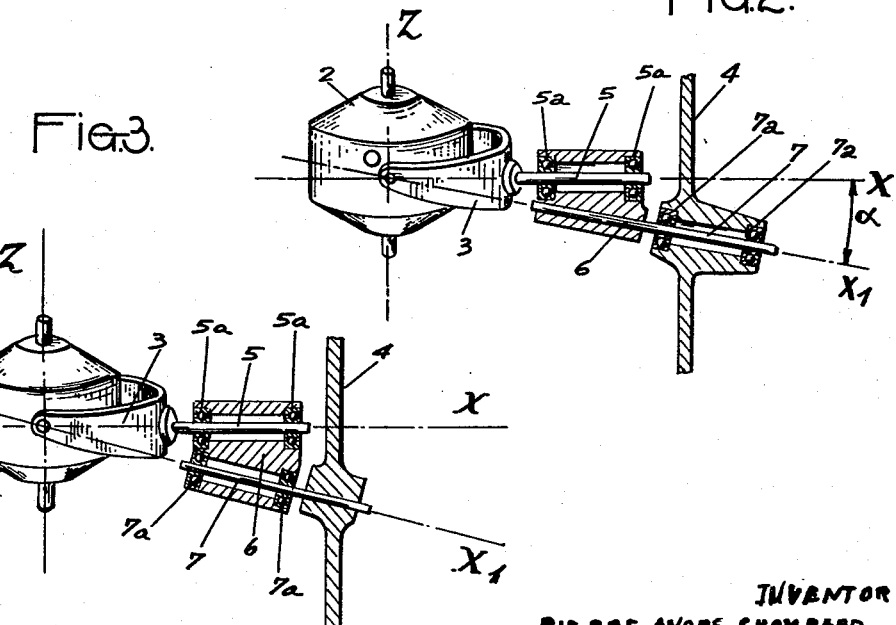
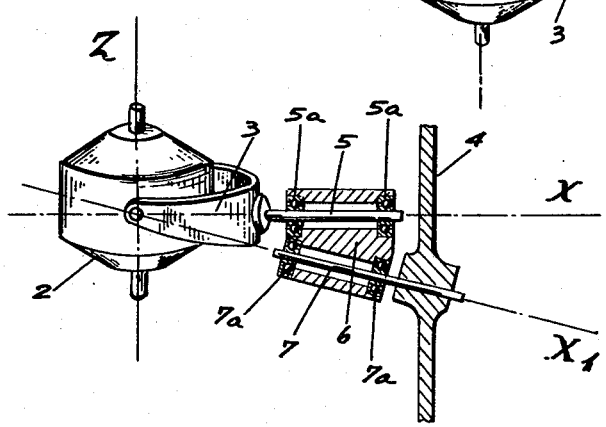
INVENTOR
PIERRE ANDRE CHOMBARD
ATTYS.

May 3, 1960  P. A. CHOMBARD  2,934,960
FREE GYROSCOPES

Filed June 29, 1953  4 Sheets-Sheet 2

INVENTOR
PIERRE ANDRE CHOMBARD
ATTYS.

May 3, 1960   P. A. CHOMBARD   2,934,960
FREE GYROSCOPES
Filed June 29, 1953   4 Sheets-Sheet 3

INVENTOR
PIERRE ANDRE CHOMBARD
McKenney & McKenney
ATTYS.

May 3, 1960 P. A. CHOMBARD 2,934,960
FREE GYROSCOPES
Filed June 29, 1953 4 Sheets-Sheet 4
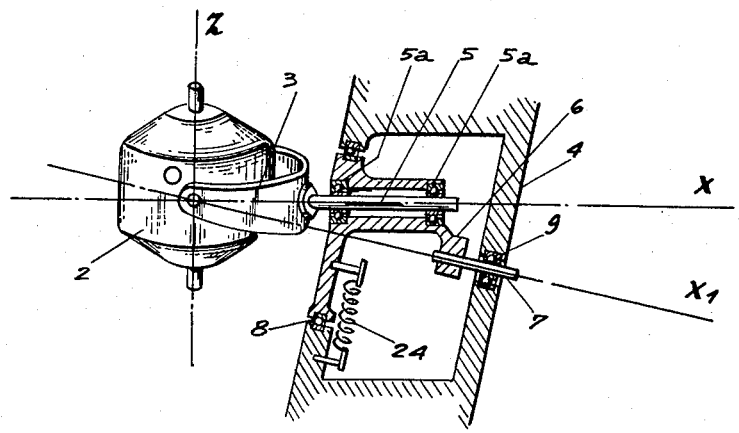
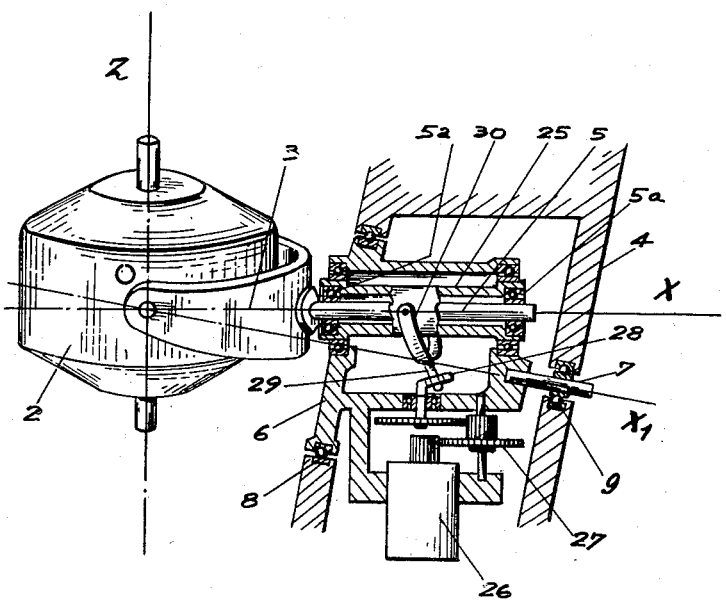
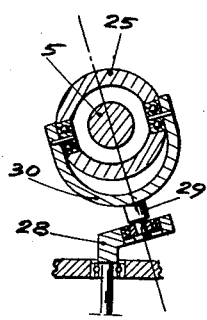
INVENTOR
PIERRE ANDRE CHOMBARD
Mawhinney & Mawhinney,
ATTYS.

United States Patent Office 2,934,960
Patented May 3, 1960

2,934,960

FREE GYROSCOPES

Pierre André Chombard, Paris, France, assignor to Etat Francais, Paris, France

Application June 29, 1953, Serial No. 364,767

Claims priority, application France July 5, 1952

12 Claims. (Cl. 74—5.2)

The present invention concerns improvements in gyroscopes having a total freedom, and more particularly, to instruments commonly called gyroscopic artificial horizons. The purpose and result of such improvements is to eliminate the disturbances caused by the suppression of one degree of freedom occuring during some flight attitudes, by the coincidence of two axes in conventional gimbal suspensions.

The improvements according to the invention also apply advantageously to the instrument described in United States application Serial No. 330,395 filed on January 9, 1953.

Figures 1 and 1A in the appended drawings, show the conventional assembly diagrams for the artificial gyroscopic horizons used in aviation.

These instruments usually comprise: a rotor 1, the rotation axis OZ of which is associated with the vertical and which is assembled in a casing 2, journalled, transversely with respect to the aircraft, along a horizontal axis OY, in a half gimbal ring 3 or a complete gimbal ring 3A, themselves being journalled longitudinally in the casing 4 of the instrument along an axis OX, perpendicular to OY, and identical or parallel with the longitudinal axis of the aircraft. Such a gyroscope is said to have three degrees of freedom.

It is well known, however, that such an arrangement, even when it has a total freedom, i.e. when it has no stops restraining the rotations about the axes OX and OY, does not allow the aircraft to go through all possible evolutions without any danger of disturbance for the gyroscope. When the aircraft flies on a vertical course, there is a falling in line of the longitudinal axis OX of the suspension and the vertical axis OZ of the gyroscope, with the result that the latter loses one degree of freedom. Thus it will be seen that if, at that moment, the aircraft has a rotation speed having a component perpendicular to the plane defined by the two gimbal suspension axes OX and OY, the gyroscope undergoes a violent disturbance.

In addition, the flight of the aircraft on a vertical course, which does not cause a coincidence of the axes OX and OZ is effected at the cost of rapid rotations of the gimbal suspension element, half-ring 3 or complete ring 3A, and of the casing 2 of the gyroscope, said rapid rotations involving inertia and friction torques which cause undesirable precessions of the gyroscope axis.

The improvements, object of the present invention, make it possible to eliminate the above mentioned serious drawbacks.

These improvements are essentially characterized by the fact that they consist in giving the gyroscope a fourth degree of freedom, owing to which the gyroscope, even in case the axes coincide, still preserves three degrees of freedom, with the result that it is not disturbed, in particular, when the aircraft flies on a vertical course.

The fourth degree of freedom is obtained by the fact that the journalling of the gimbal suspension element is effected in one or two intermediate parts, said two parts being possibly associated together and journalled in the casing of the instrument along an axis defined by any one generatrix of a cone co-axial with the journalling axis of said gimbal suspension element, the apex of which coincides with the suspension center of the gyroscope, the apex angle of said cone being determined according to constructional facilities and the nature of the desired result.

In some cases for which it is desirable to keep the journalling axis of the gimbal suspension element parallel with the longitudinal axis of the aircraft, for all flight attitudes remote from vertical flight, a locking or resilient securing device is provided for the intermediate part, or one of the intermediate parts, making it possible to suppress the fourth degree of freedom at the desired moments.

Other features and advantages of the invention will appear from the description given hereinafter with reference to the appended diagrammatic drawings given merely by way of explanatory but not limitative examples.

In these drawings:

Figures 1 and 1A, as stated above, are diagrams for the usual assembling of conventional gyroscopic artificial horizons.

Figures 2, 2A, 2B, 3, 4, and 5, represent various possible non-limitative forms of embodiment for the mounting of a gyroscope with four degrees of freedom, according to the invention.

Figure 10 represents a modified embodiment according to which the suspension axis of the half gimbal ring is automatically held parallel with the longitudinal axis of the aircraft, for all cases of flight remote from a vertical flight.

Figure 11 shows another form of embodiment in which the sensitivity of the bearings of the pivoting pins is improved.

Figure 12 is a detail view showing a portion of the device making it possible to "sensitize" the bearings for improving their sensitivity.

Figure 2A:
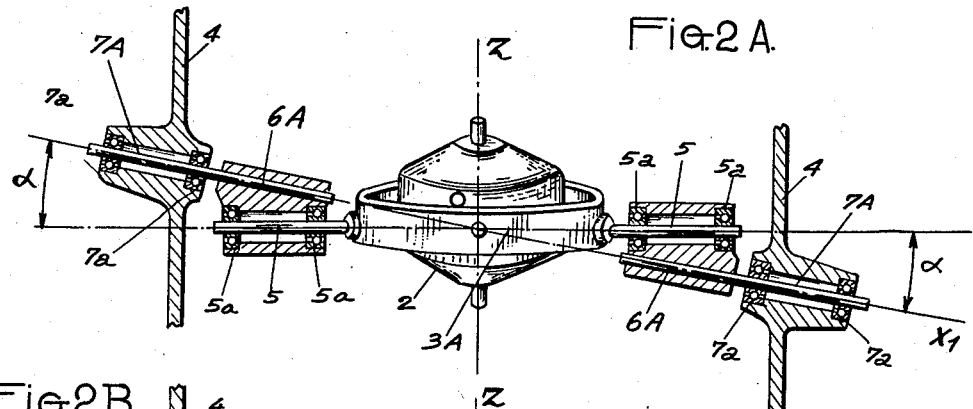

According to the present invention, the fourth degree of freedom for the gyroscope is obtained (see Figure 2) by the fact that the suspension spindle 5 of the half gimbal ring 3 defining the axis OX, instead of rotating directly in the casing 4 of the instrument, is journalled by means of ball bearings 5a in an intermediate part 6 which is itself journalled in the casing 4 of the instrument by means of a spindle 7 associated therewith and ball bearings 7a, associated with the casing 4. The rotation spindle 7 of the intermediate part 6 is arranged along a direction $OX_1$ passing through the center O of the suspension and making, with the axis OX, an angle $\alpha$ the value of which is determined according to constructional possibilities and the nature of the desired result. Whatever may be the relative position of axis $OX_1$ with respect to axis OX, it is always identical with the generatrix of a cone having an axis OX and a half angle at the apex $\alpha$.

Figure 2A represents a device similar to that of Figure 2, except for the following points: the half ring 3 is replaced by a complete ring, 3A, the intermediate part 6 is replaced by two similar intermediate parts 6A and the trunnioning spindle 7 is replaced by a spindle made of two elements 7A.

Figure 2B:
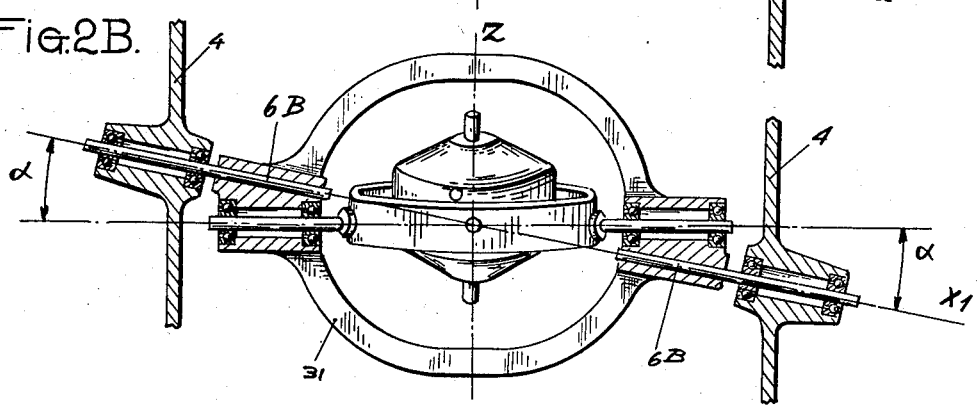

Figure 2B represents a device similar to that shown in Figure 2A, but in which the two intermediate parts 6B are associated with each other by means of the part 31.

Devices similar to those of Figures 2A and 2B, comprising two intermediate parts associated with each other or not, may be derived from Figures 3, 4, 5, 6, 8, 10 and 11. For the sake of simplicity, they shall no longer be referred to.

It is immediately apparent that the gyroscope thus has a fourth degree of freedom, and that in the case of flight along a vertical course in which the axis OX is identical with the axis OZ, which causes the suppression of one of these degrees of freedom, the gyroscope, however, preserves three degrees of freedom making it possible for it to operate without any disturbances.

The arrangement of the trunnions 5 and 7 with respect to the intermediate part 6 may vary according to constructional considerations.

Thus, by way of an explanatory and non limitative example, the trunnions 5 and 7 (see Figure 3) may be respectively associated with the half ring 3 and the casing 4 and mounted in bearings 5a and 7a, the outer rings of which are both integral with the intermediate part 6.

Figure 4:
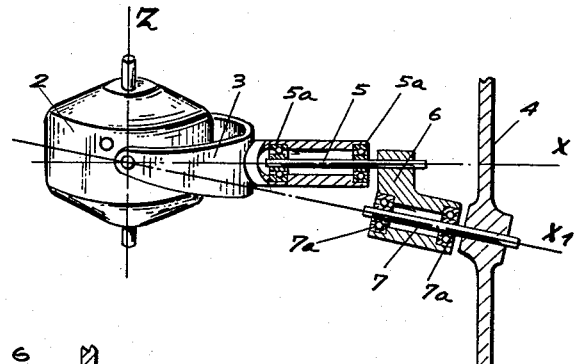

According to a modified embodiment shown in Figure 4, the outer ring of bearings 5a is associated with the half ring 3 and trunnion 5 is associated with the part 6, while the outer ring of bearings 7a is associated with the part 6 and trunnion 7 is associated with the casing 4.

Figure 5:
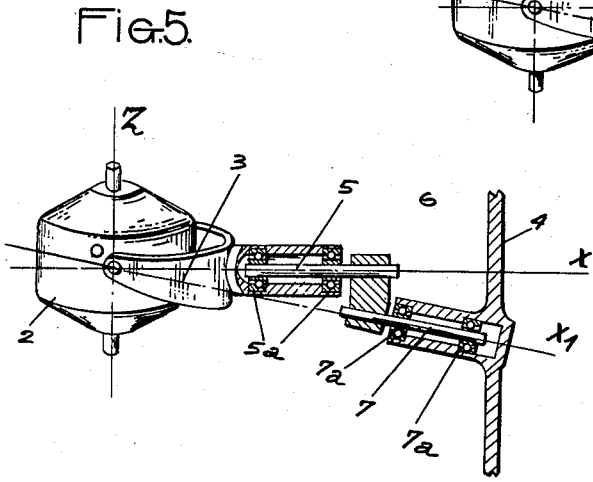

According to another modified embodiment shown in Figure 5, the two trunnions 5 and 7 are associated with the part 6, while the outer rings of bearings 5a and 7a are associated respectively with the half ring 3 and casing 4.

It is quite obvious, on the other hand, that the arrangement of the bearings for the spindles 5 and 7 may be different from the above examples with a view to reducing bulk and overhangs, as shown, for example, in Figures 6, 8, 10 and 11. Thus, in particular, the arrangement shown in Figure 6 may be adopted, in which one of the bearings of the spindle 7 is replaced by a large bearing 8, the inner ring of which is integral with the intermediate part 6 and the outer ring integral with the casing 4 and in which the trunnion 7, integral with the part 6, is mounted in a bearing 9 the outer ring of which is also integral with the casing 4.

It is quite obvious, on the other hand, that static balancing about the axes OX and $OX_1$ should be effected in accordance with standard rules.

According to the uses of the gyroscope of the invention, it may be advantageous to so arrange the apparatus that in the case of a horizontal flight, the axis OX or the axis $OX_1$ be perpendicular to the plane OYZ, this arrangement however not being imperative.

In other uses of the present invention, and particularly when used with the instrument described in the aforesaid United States patent application Serial No. 330,395 filed January 9, 1953 by the applicant, and in which a course reference is picked up, it is desirable to keep the axis OX parallel to the longitudinal axis of the aircraft for all flight attitudes remote from vertical flying.

There is provided, to this end, a locking device for the intermediate part 6 with respect to the casing 4 of the instrument, the purpose of which is to suppress the fourth degree of freedom provided by the axis $OX_1$ for all flight attitudes remote from vertical flying.

Figure 6:
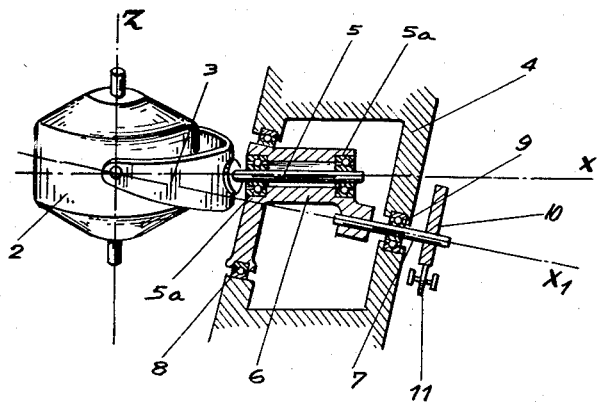
Figure 6 is a diagram representing a gyroscope mounted in accordance with the invention, with a manually controlled device for locking the intermediate part.
Figure 7:
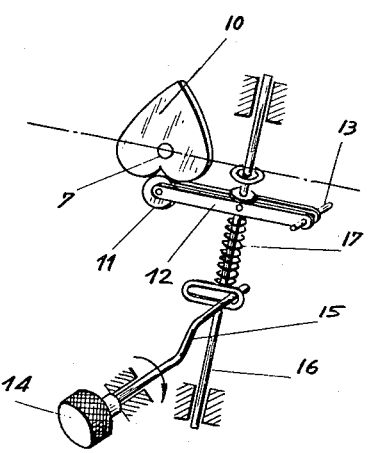
Figure 7 is a detail view representing the control for the locking device.

The locking device may, for instance, be constituted as shown in Figures 6 and 7. A heart shaped cam 10 is keyed on the trunnion 7 which, as previously seen, is itself associated with the intermediate part 6. This heart shaped cam 10 may be locked in position by means of a roller 11 mounted at the end of a lever 12 pivoted at its other end on a pivot pin 13.

The roller-carrying lever 12 may be operated by means of a control knob 14, through a hand crank 15 and a sliding rod 16 connected with the lever 12 through a spring 17. It is immediately apparent, from an inspection of Figure 7, that the resilient pressure of the roller 11 on the cam 10, makes it possible to immobilize the latter and consequently the intermediate part 6 in the desired position.

The necessity for the pilot of the aircraft to act himself in releasing or immobilizing the intermediate part by operating the control knob 14 according to whether or not he is intending to go through evolutions involving flying along a vertical course, may be deemed undesirable.

Figure 8:
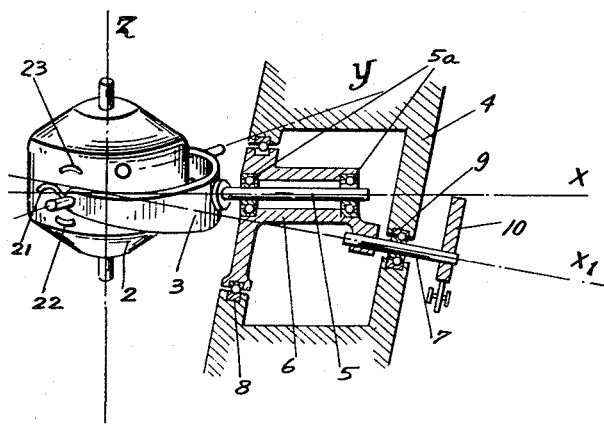
Figure 8 represents a modification of Figure 6 according to which the locking device for the intermediate part is automatically controlled.
Figure 9:
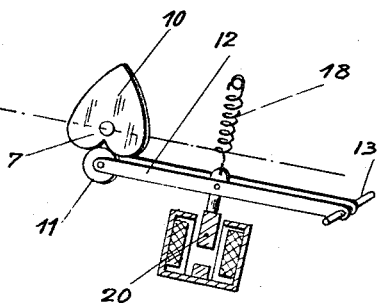
Figure 9 is a detail view showing the automatic control for the locking device.

In the latter case, an automatic locking and unlocking control device may be used, as for instance the one shown in Figures 8 and 9.

In said figures the same locking elements are found as in the previous case; namely: a heart shaped cam 10, keyed on the trunnion 7 and a locking roller 11 mounted at the end of a lever 12 pivoted at 13.

The control for the lever 12, on the other hand, is automatic. To this effect, the lever 12 is constantly urged to its upper position ensuring the locking of cam 10 by a spring 18 and it may be brought to its lower position ensuring the unlocking of the cam 10 by the action of an electromagnet 19 acting on a plunger 20 integral with the lever 12. The energizing of the electromagnet 19 is caused automatically by the electrical contact between a brush 21, associated with the half gimbal ring 3 and one or the other of two contacting surfaces 22 and 23 associated with the casing 2 of the gyroscope, said surfaces being so arranged that the electrical contact is effected when the axis OX makes with the axis OZ the angle which has been set as a limit for the putting in service of the fourth degree of freedom.

It is quite obvious that this mode of embodiment has been given only by way of a purely explanatory example and that the converse solution i.e. the locking of the cam 10 by the electromagnet 19 and the unlocking by the spring 18 is also possible. The electromagnet may be replaced by a motor of another type.

Another solution for keeping the axis OX parallel with the longitudinal axis of the aircraft for all flight attitudes remote from vertical flight, consists (see Figure 10) in connecting, by means of one or more springs of any type, such as 24, the intermediate part 6 with the casing 4 of the instrument, so that the axis OX shall be kept parallel with the longitudinal axis of the aircraft for all cases of flight remote from vertical flight.

With this arrangement, flying along a vertical course may cause slight precessions of the axis of the gyroscope, due to the action of the springs 24, but the said precessions will remain of a negligible order of magnitude.

The overhung mounting for the spindles OX and $OX_1$ constitutes an unfavourable condition for the operation of the ball bearings which are heavily loaded. This drawback may be obviated by "activating" these bearings so as to improve their sensitivity.

This result may be obtained by the construction shown by way of example in Figures 11 and 12.

In this example, the outer ring of the bearings 5a of the spindle OX is mounted in a sleeve 25, itself rotating in the intermediate part 6. This sleeve 25 receives an alternate rotation motion about its axis by means of a small electric motor 26 secured to the intermediate part 6, which operates, through a speed reducing gear train 27, a crank 28 driving in turn the tail piece 29 of a yoke 30 transversely pivoted on the sleeve 25. It is immediately apparent that the yoke 30 thus imparts to the sleeve 25 a sinusoidal reciprocating rotation motion which sensitizes the bearings of the trunnion 5 of the half gimbal ring 3.

It is quite obvious that the same mode of activation may be applied advantageously to the bearings defining the axis $OX_1$.

It will be obvious, further, that the invention has been described and illustrated merely by way of indication and not limitatively and that detail modications may be made thereto within the scope of the invention.

I claim:

1. A navigational instrument comprising a rotor mounted for rotation about a substantially vertical axis, a gimbal member, a casing for the rotor journalled to the gimbal member along a horizontal axis, a casing member for the rotor, the casing and the gimbal member, a rotatable connection between said gimbal member and said casing member comprising at least one intermediate member, a first spindle extending from said gimbal member to said intermediate member and fixed to one of said members and rotatably connected to the other of said members, and a second spindle extending from said intermediate member to said casing member and fixed to one of said members and rotatably connected to the other of said members, the longitudinal axis of the second spindle being identical with the generatrix of a cone having the longitudinal axis of the first spindle as its axis and means for at times preventing the rotation of said second spindle.

2. A navigational instrument as claimed in claim 1, wherein said first spindle is fixed to said gimbal member, bearings are disposed between said intermediate member and said first spindle, said second spindle is fixed to said intermediate member and bearings are disposed between said casing member and said second spindle.

3. A navigational instrument as claimed in claim 1, wherein said first spindle is fixed to said gimbal member, said second spindle is fixed to said casing member, and bearings are disposed between said intermediate member and said spindles.

4. A navigational instrument as claimed in claim 1, wherein said first spindle is fixed to said intermediate member, bearings are disposed between said gimbal member and said first spindle, said second spindle is fixed to said casing member, and bearings are disposed between said intermediate member and said second spindle.

5. A navigational instrument as claimed in claim 1, wherein said first and second spindles are fixed to said intermediate member, bearings are disposed between said gimbal member and said first spindle, and bearings are disposed between said casing member and said second spindle.

6. A navigational instrument as claimed in claim 1, wherein said preventing means comprises a cam fixed on said second spindle and having a notch therein, a pivotally mounted lever, a roller on said lever, resilient means for urging said lever about its pivot so that said roller is received by said notch to lock the cam and said second spindle against rotation, and manually operated means for moving said lever about its pivot to withdraw said roller from said notch to release said cam and said second spindle to permit rotation thereof.

7. A navigational instrument as claimed in claim 1, wherein said preventing means comprises a cam fixed on said second spindle and having a notch therein, a pivotally mounted lever, a roller on said lever, resilient means for urging said lever about its pivot so that said roller is received by said notch to lock the cam and said second spindle against rotation, electro magnetic means connected to said lever for moving said lever about its pivot to withdraw said roller from said notch to release said cam and said second spindle to permit rotation thereof, and means for automatically operating said electro magnetic means comprising cooperating electrical contacts on said casing and said gimbal member.

8. A navigational instrument as claimed in claim 1, wherein the longitudinal axis of the first spindle is substantially perpendicular to the horizontal axis of the journal between said gimbal member and said casing, the longitudinal axis of the second spindle being identical with the generatrix of a cone having the longitudinal axis of the first spindle as its axis.

9. A navigational instrument as claimed in claim 2, wherein bearings are disposed between said intermediate member and said casing member.

10. A navigational instrument as claimed in claim 9, wherein at least one spring has one end secured to said casing member and its other end secured to said intermediate member.

11. A navigational instrument comprising a rotor mounted for rotation about a substantially vertical axis, a complete gimbal ring member, a casing for the rotor journalled to the gimbal ring member along a horizontal axis, a casing member for housing the rotor, the casing and the gimbal ring member, a pair of rotatable connections between said gimbal ring member and said casing member each comprising an intermediate member, a first spindle extending from said gimbal ring member to said intermediate member and fixed to one of said members and rotatably connected to the other of said members, and a second spindle extending from said intermediate member to said casing member and fixed to one of said members and rotatably connected to the other of said members, said second spindle being disposed at an angle to said first spindle of less than ninety degrees, and means for at times preventing the rotation of said second spindle.

12. A navigational instrument as claimed in claim 11, wherein the intermediate member of one rotatable connection is joined to the intermediate member of the other rotatable connection.

References Cited in the file of this patent

UNITED STATES PATENTS

| | | |
|---|---|---|
| 2,246,738 | Lauck | June 24, 1941 |
| 2,410,602 | Davis | Nov. 3, 1946 |
| 2,439,358 | Divoll | Apr. 6, 1948 |
| 2,450,875 | Braddon et al. | Oct. 12, 1948 |
| 2,512,607 | Braddon | June 27, 1950 |

FOREIGN PATENTS

| | | |
|---|---|---|
| 635,192 | Great Britain | Apr. 5, 1950 |